UNITED STATES PATENT OFFICE.

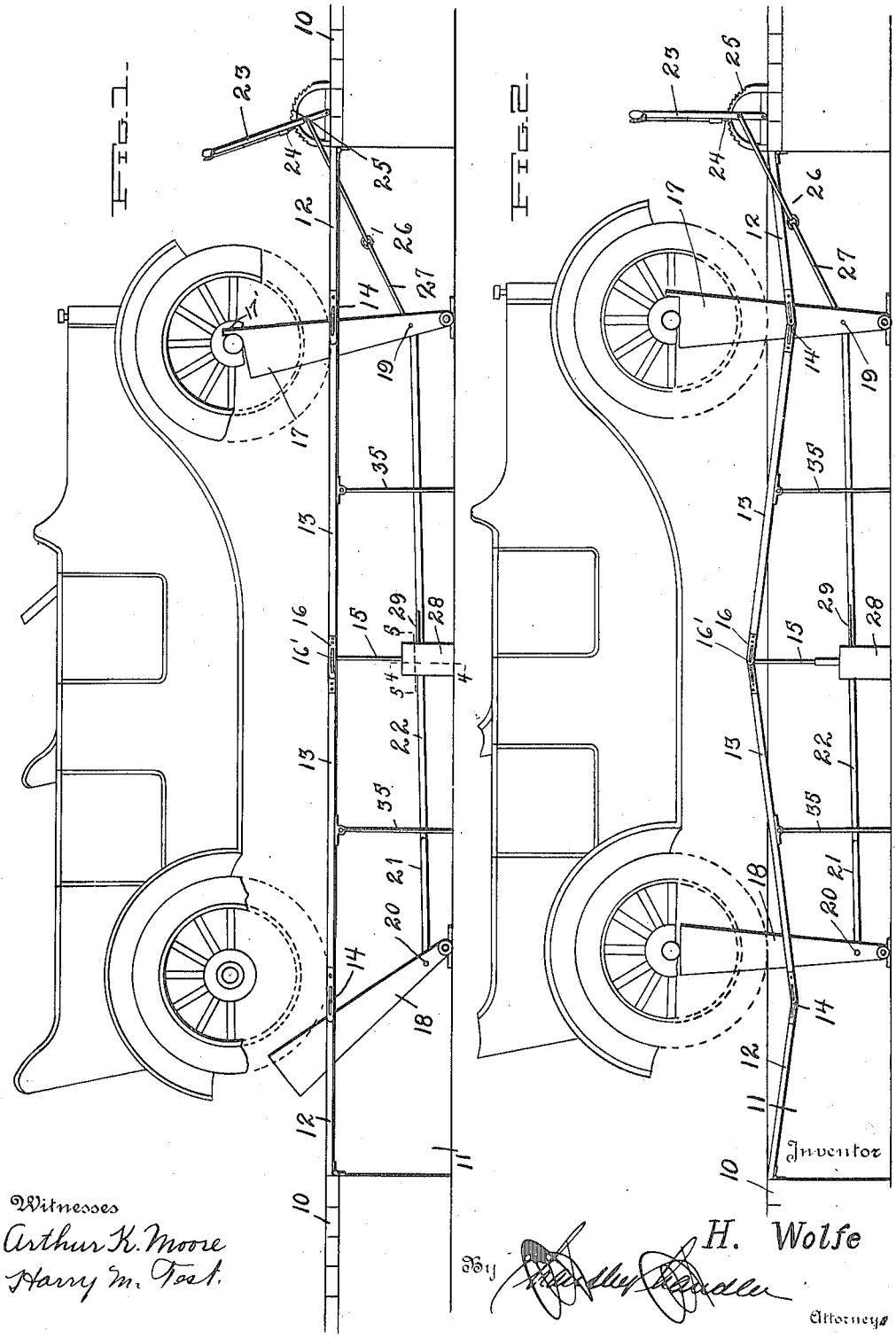

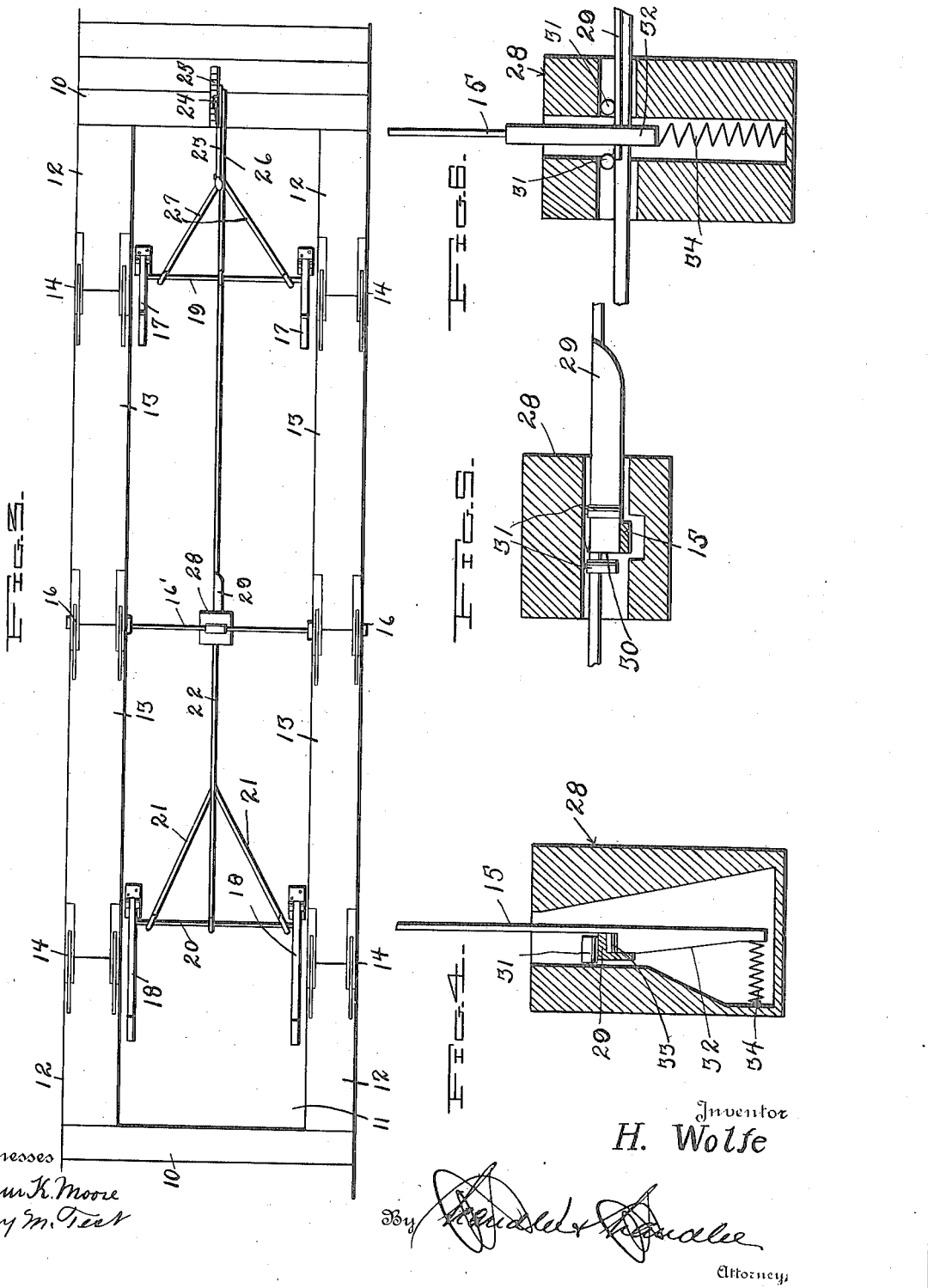

HOWARD WOLFE, OF PLYMOUTH, INDIANA.

AUTOMOBILE-STAND.

1,190,837.

Specification of Letters Patent.

Patented July 11, 1916.

Application filed February 4, 1915. Serial No. 6,176.

*To all whom it may concern:*

Be it known that I, HOWARD WOLFE, a citizen of the United States, residing at Plymouth, in the county of Marshall, State of Indiana, have invented certain new and useful Improvements in Autmobile-Stands; and I do hereby declare the following to be a full, clear, and exact description of the invention, such as will enable other skilled in the art to which it appertains to make and use the same.

This invention relates to improvements in automobile stands and particularly to stands for supporting automobiles while repairing or while stored in a garage.

The principal object of the invention is to provide a device of this character which will support the automobile by means of the axles so that the weight of the car will be taken off the tires, thus greatly lengthening the life of the tires.

Another object is to provide a device of this character which is automatic in its action to lift the automobile so as to take the weight from the tires and to again restore the machine on to the floor surface on the tires.

Other objects and advantages will be apparent from the following description when taken in connection with the accompanying drawing.

In the drawing: Figure 1 is an elevation of my improved stand or support for the automobile, the same being in normal position, and an automobile therein in the act of tripping the device, Fig. 2 is a side elevation showing the device where it has been tripped and the automobile supported on its axles, Fig. 3 is a plan view of the platform in normal position, Fig. 4 is an enlarged vertical section on the line 4—4 of Fig. 1, Fig. 5 is an enlarged horizontal section on the line 5—5 of Fig. 1, and Fig. 6 is a section on the same line as Fig. 4, showing the platform depressed.

Referring particularly to the accompanying drawing, 10 represents the floor of the garage in which is formed a pit 11. This pit is bridged by tracks made up of sections 12 and 13 pivotally and slidably connected together at 14 the two sections 13 being pivotally and slidably connected together, as clearly shown at 16. A vertical rod 15 is disposed between the tracks adjacent the joints 16, and is movably connected at its upper end to the center of a bar 16' which extends between the tracks and has its ends secured in the opposite end of the track sections forming the pivotal connections 16 therefor.

Extending upwardly between the tracks are the front jacks 17 and the rear jacks 18, the lower ends of these jacks being pivotally mounted in the bottom of the pit. Connecting the jacks 17 above their pivots is a transverse bar 19 while a similar bar 20 connects the jacks 18 above their pivots at a point slightly less in height than that to which the bar 19 is connected. Connected to the ends of the rod 20 are inclined bars 21 their other ends being connected together at a single point on a longitudinal operating rod 22 which is movably connected at its opposite ends to intermediate points on the rods 19 and 20. On the floor of the garage at one end of the pit is mounted a vertical pivoted lever 23 provided with a pawl 24 which engages with a rack segment 25. Connected to this lever and to the rod 19 is a connecting link 26, brace rods 27 connecting the rod 19 with the link 26. The lower end of the vertical rod 15 slides vertically in a block 28 mounted in the bottom of the pit, the intermediate portion of the rod 22 sliding horizontally through the block and adjacent the lower end of the rod 15. The intermediate portion of the rod 22 is formed with a flange 29 which extends laterally from the rod and tapers longitudinally, the larger end providing an abrupt shoulder 30. In the block above the rod 22 are rollers 31 forming intake friction means to guide the movement of the rod smoothly through the block. The vertical rod 15 also is provided with a longitudinally extending and tapering flange 32, the upper end of which carries a roller 33. The lower end of the rod below the rod 22 is connected to one end of a spring 34 carried by the block, the tendency of this spring being normally to draw the rod 15 toward the rod 22. The intermediate portions of the sections 13 are pivotally supported on the upper ends of uprights 35 mounted in the pit.

In normal position, the tracks extend straight across the pit, the jacks 17 and 18 being in inclined positions, as clearly shown. An automobile is run on to the tracks from the side of the pit opposite to the lever 23, the tracks being held in such position by the engagement of the roller 33 under the intermediate portion of the rod 22 within the block. As soon as the front axle strikes the front jacks 17 projections 17' permit of the axle swinging the jacks toward vertical position. This draws the rod 22 and pulls the rear jacks also which engage under the rear axle. Further movement of the vehicle moves the jacks into upright position and by means of the link 26 forces the lever 23 into upright position, the pawl of the lever engaging the teeth of the segment 25 and holding the same against backward movement. The forward movement of the rod 22 greatly moves its flanges 29 until the shoulder 30 passes the roller 33, thus permitting the joint 16 to rise and the joints 14 to lower, and depress the tracks below the tires of the automobile. Thus the automobile is suspended on the jacks 18 and 17 and the tires relieved of the weight of the vehicle.

To permit the automobile to run off the tracks the pawl of the lever 23 is released and the lever swung toward the pit. This rocks the jacks 18 and 17 so that the automobile swings down and rests on the tracks. Then, as the automobile, under its own power moves to back off, the weight of the front of the machine will bear down on the connected ends of the sections 13 depressing the rod 15 and again latching it with the rod 22. This downward motion of the connections 16 raises the connections 14 so that the tracks assume a horizontal position. The tracks are then ready for another machine to pass thereonto.

It will be seen that the spring 34 will automatically engage the rod 15 with the rod 22 when the joints 16 are depressed, thus locking the device so that the cars are disposed in horizontal position for an automobile to be run thereon.

What is claimed is:

1. An automobile stand comprising movable and tiltable track sections, means for holding said track sections from tilting, means movable by an automobile for supporting the same, means for holding the latter in operative position and connected with the automobile holding means for releasing the holding means whereby the track sections may automatically tilt below the automobile wheel.

2. An automobile stand comprising a plurality of movably connected tiltable track sections for supporting a moving automobile, jacks movable by the automobile for supporting the same, members connected to certain of said track sections and the jacks for tilting the track sections from below the wheels of the automobile and a manually operable lever for holding the track sections in tilted position.

3. An automobile stand comprising movable and tiltable track sections, means for holding said track sections from tilting, jacks movable by an automobile for supporting the same, a ratchet connected to said jacks for holding the latter in operative position, and means connected to the said holding means and the jacks for releasing the holding means upon the movement of the jacks to an operative position.

4. An automobile stand comprising movable and tiltable track sections, a depressible latch member connected to certain of said track sections, jacks moved by an automobile for supporting the same, a hand operated ratchet lever for holding the latter in operative position, and a rod connecting said jacks together and including a shoulder adapted to engage the latch member when the latter is depressed to hold the said track sections in an operative position.

In testimony whereof, I affix my signature, in the presence of two witnesses.

HOWARD WOLFE.

Witnesses:
JAMES M. SHAFFER,
LEO G. BOLLMAN.